(12) United States Patent
Wei

(10) Patent No.: US 7,180,547 B2
(45) Date of Patent: Feb. 20, 2007

(54) CAMERA PLATFORM ASSEMBLY

(75) Inventor: David Wei, Taipei (TW)

(73) Assignee: E-Benk Tech Co., Ltd., Taipei Hsien (TW)

(*) Notice: Subject to any disclaimer, the term of this patent is extended or adjusted under 35 U.S.C. 154(b) by 764 days.

(21) Appl. No.: 10/609,868

(22) Filed: Jun. 30, 2003

(65) Prior Publication Data

US 2004/0263679 A1   Dec. 30, 2004

(51) Int. Cl.
*H04N 5/225* (2006.01)
(52) U.S. Cl. ........................... 348/375; 396/427
(58) Field of Classification Search ........... 348/375; 396/427

See application file for complete search history.

(56) References Cited

U.S. PATENT DOCUMENTS

| | | | | |
|---|---|---|---|---|
| 4,341,452 A | * | 7/1982 | Korling | 396/428 |
| 5,473,368 A | * | 12/1995 | Hart | 348/155 |
| 6,268,882 B1 | * | 7/2001 | Elberbaum | 348/151 |
| 6,462,775 B1 | * | 10/2002 | Loyd et al. | 348/151 |
| 7,046,295 B2 | * | 5/2006 | Hovanky | 348/373 |
| 2005/0122424 A1 | * | 6/2005 | Overstreet | 348/373 |

* cited by examiner

*Primary Examiner*—Tuan Ho
(74) *Attorney, Agent, or Firm*—Pai Patent & Trademark Law Firm; Chao-Chang David Pai

(57) ABSTRACT

A camera platform assembly is disclosed and claimed to include a control base adapted to receive control signal, a rotary table horizontally rotatably supported on the control base and controlled to rotate horizontally on the control base by control signal received by the control base, and movable rack pivoted to the rotary table and adapted to carry a camera and to adjust the angle of inclination of the camera.

12 Claims, 11 Drawing Sheets

CAMERA PLATFORM ASSEMBLY

BACKGROUND OF THE INVENTION

1. Field of the Invention

The present invention relates to a camera platform and, more particularly, to a camera platform assembly, which can be controlled to adjust the direction and the angle of inclination of the loaded camera conveniently and remotely.

2. Description of the Related Art

Following fast development of information technology, the use of photographing and video recording systems becomes popular. Regular photographing and video recording systems include digital still cameras, digital video cameras, and surveillance systems. When using a digital still camera or digital video camera to pick up images, it is difficult to hold the camera with the hands firmly in position. In order to prevent a vibration, a tripod or the like may be used to hold the camera firmly in the desired position. After loading of a camera on the camera platform of a tripod, the user may have to adjust the direction and the angle of inclination of the camera. When changing the direction of the camera, the user has to shift the tripod. After the tripod is set to point the camera in the desired direction, the user has to loosen the lock screw, and then fasten the lock screw again after adjusting the angle of inclination of the camera. It is inconvenient to adjust the direction and the angle of inclination of the camera in this way. Further, the user cannot adjust the shooting direction of the camera when photographing.

Therefore, it is desirable to provide a camera platform assembly for a tripod or the like, which eliminates the aforesaid drawbacks.

BRIEF SUMMARY OF THE INVENTION

The present invention has been accomplished under the circumstances in view. It is the main object of the present invention to provide a camera platform assembly, which can be conveniently controlled to adjust the direction and the angle of inclination of the loaded camera. It is another object of the present invention to provide a camera platform assembly, which enables the user to control the direction of the loaded camera from a remote place. It is still another object of the present invention to provide a camera platform assembly, which is easy to install.

To achieve these and other objects of the present invention, the camera platform assembly is adapted to carry a camera and to control the angular position of the camera, comprising: a control base adapted to receive control signal for controlling the position of a camera carried on the camera platform assembly; a rotary table coupled to the control base for free rotation to adjust the position of a camera carried on the camera platform assembly, the rotary table comprising a barrel fixedly located on a top side thereof, and a plurality of locating grooves axially formed in the barrel of the rotary table and arranged in parallel; and a movable rack coupled to the rotary table and adapted to hold a camera and to adjust the angle of inclination of the camera carried thereon, the movable rack comprising a base frame, the base frame comprising two barrels axially aligned in a line at two sides of the barrel of the rotary table and a plurality of locating grooves axially formed in one barrel of the movable rack and arranged in parallel corresponding to the locating grooves of the rotary table, a control shaft inserted into the barrels of the movable rack and the barrel of the rotary table to pivotally secure the base frame to the barrel of the rotary table and axially movable relative to the barrels of the base frame and the barrel of the rotary table between a first position to lock the base frame and a second position to unlock the base frame for enabling the base frame to be turned relative to the rotary table, the control shaft having a plurality of longitudinal teeth arranged in parallel around the periphery thereof and adapted to engage the locating grooves of the base frame and the locating grooves of the rotary table, a holder frame mounted on the base frame and adapted to accommodate a camera, and a locking member pivoted to the base frame and adapted to lock the holder frame.

DETAILED DESCRIPTION OF THE PREFERRED EMBODIMENT

As illustrated in FIGS. 1A~1F, the camera platform assembly 100 comprises a control base 102, a rotary table 104, and a movable rack 106. The control base 102 is adapted to receive control signal for controlling the positioning status of the camera. The rotary table 104 is coupled to the control base 102, for enabling the camera to be rotated horizontally through 360° relative to the control base 102. The movable rack 106 is fastened pivotally with the rotary table 104, and adapted to carry the camera, for enabling the camera to be adjusted to the desired angle of inclination (i.e., for enabling the camera to be turned in a direction perpendicular to the rotary table 104).

Figure 2:
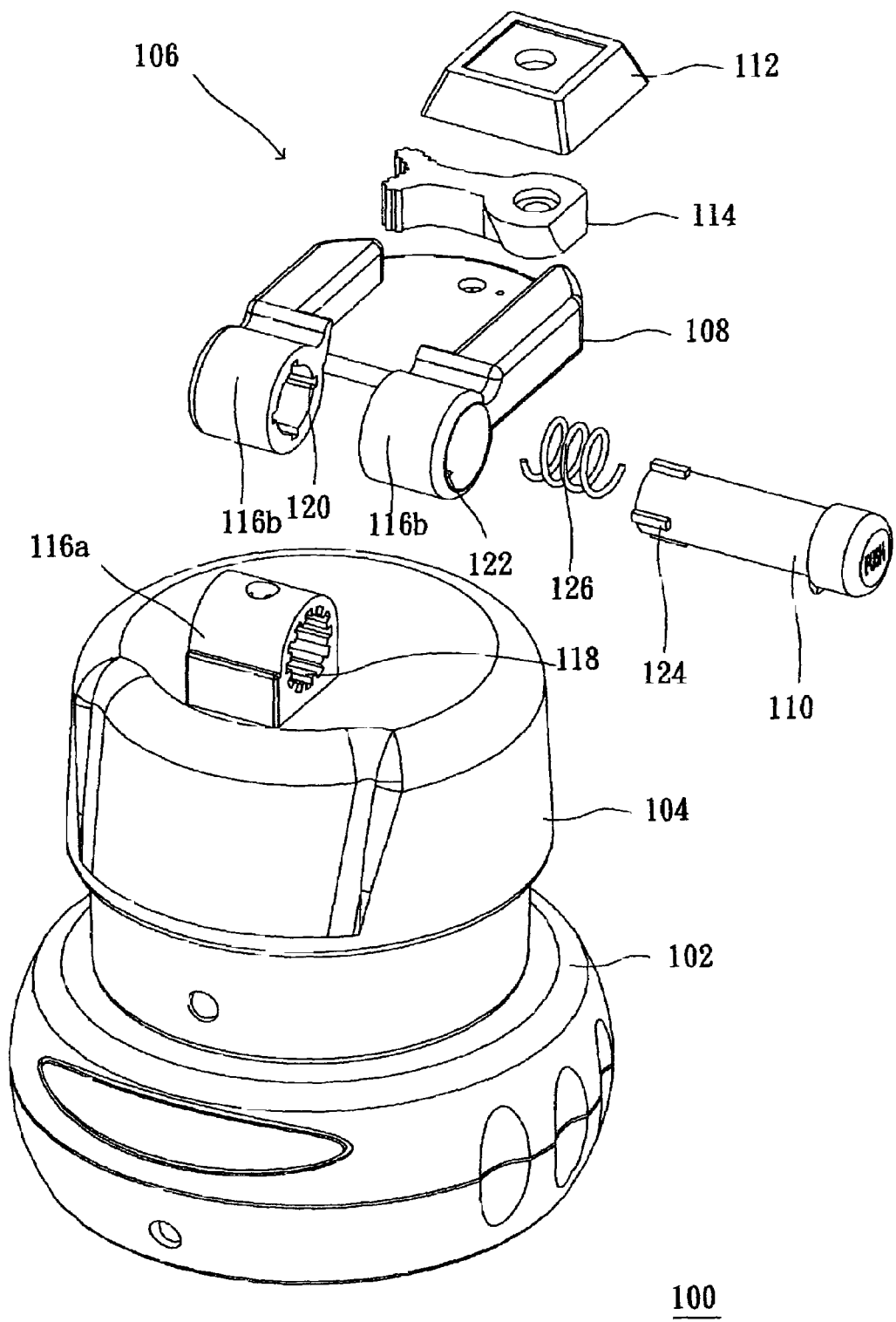
FIG. 2 is an exploded view of the camera platform assembly according to the first embodiment of the present invention.
Figure 3:
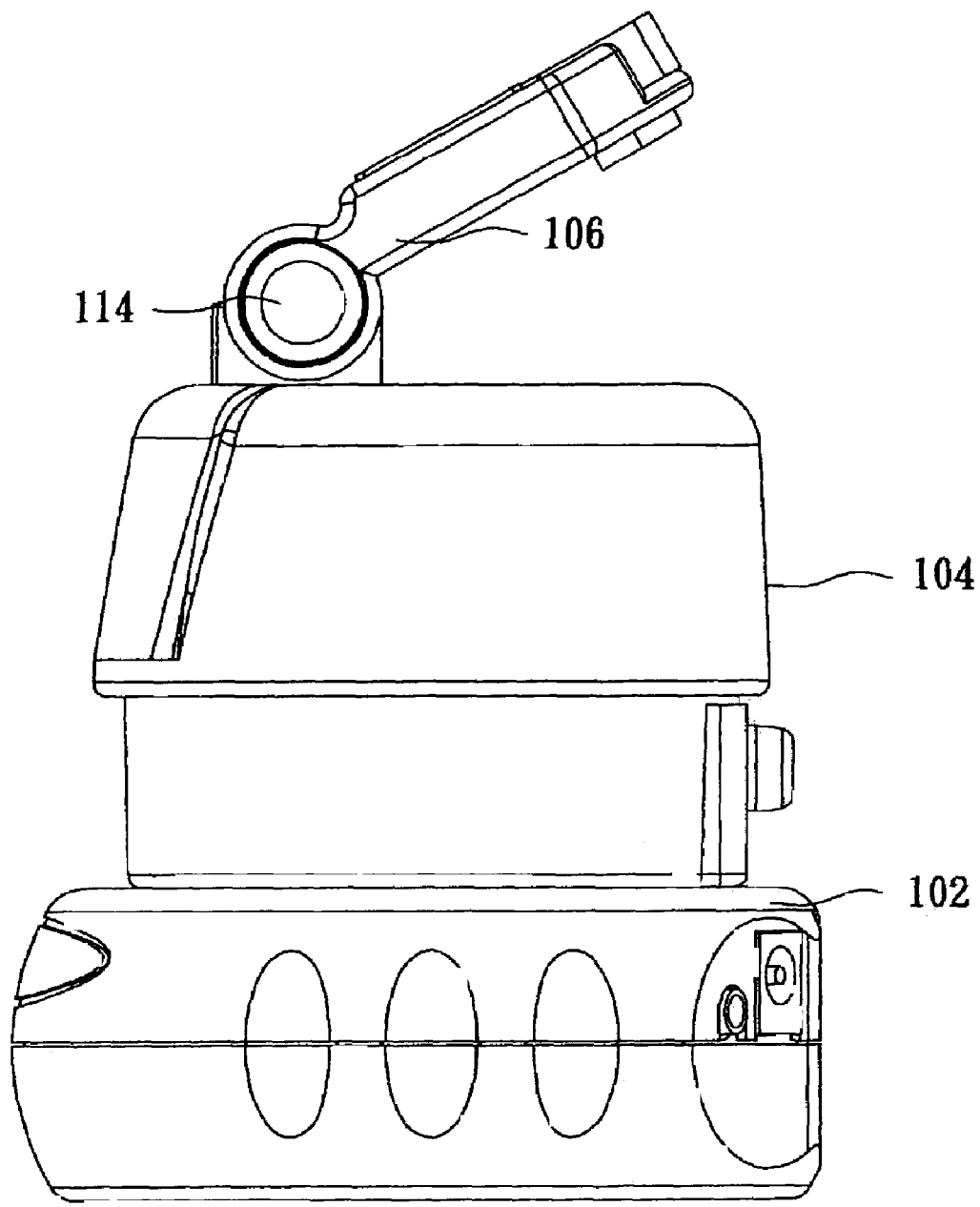
FIG. 3 is a schematic drawing of the first embodiment of the present invention, showing the movable rack adjusted to a specific angle of inclination.

The detailed structural features of the camera platform assembly 100 will be described hereinafter with reference to FIGS. 2 and 3. The movable rack 106 is comprised of a base frame 108, a control shaft 110, a holder frame 112, and a locking member 114. The holder frame 112 is coupled to the base frame 108 and adapted to accommodate a camera. The locking member 114 is pivoted to the base frame 108 and adapted to lock the bolder frame 112. The rotary table 104 comprises a barrel 116a fixedly located on the top near the border. The barrel 116a has a plurality of locating grooves 118 in the inside wall. The base frame 108 comprises two barrels 116b, a plurality of locating grooves 120 formed in the inside wall of one of the barrels 116b corresponding to the locating grooves 118 in the barrel 116a of the rotary table 104, and a female retaining portion 122 formed in the inside wall of the other of the barrels 116b. The control shaft 110 is axially movably inserted into the barrels 116b of the base frame 108 of the movable rack 106 to pivotally secure the movable rack 106 to the barrel 116a of the rotary table 104, having a plurality of longitudinal teeth 124 arranged in parallel around the periphery of one end thereof and adapted to engage the locating grooves 118 and 120. The control shaft 110 is moved axially between the locking position where the teeth 124 are engaged into the locating grooves 120 of the movable rack 106 and the locating grooves 118 of the rotary table 104 and the movable rack 106 is locked, and the unlocking position where the teeth 124 are engaged into the locating grooves 120 of the movable rack 106 and disengaged from the locating grooves 118 of the rotary table 104 and the movable rack 106 is unlocked for adjustment. Therefore, the user can rotate the rotary table 104 on the control base 102 and turn the movable rack 106 relative to the barrel 116a of the rotary table 104 to adjust the position of the camera at the holder frame 112 horizontally as well as vertically.

The movable rack 106 further comprises a spring member, for example, a compression spring 126 supported between the control shaft 110 and one of the barrels 116b of the base frame 108 of the movable rack 106. The compression spring 126 imparts a pressure to the control shaft 110, holding the control shaft 110 in the locking position. Therefore, the compression spring 126 automatically returns the control shaft 110 to the locking position to lock the movable rack 106 after each position adjustment of the camera by the user.

Figure 1A:
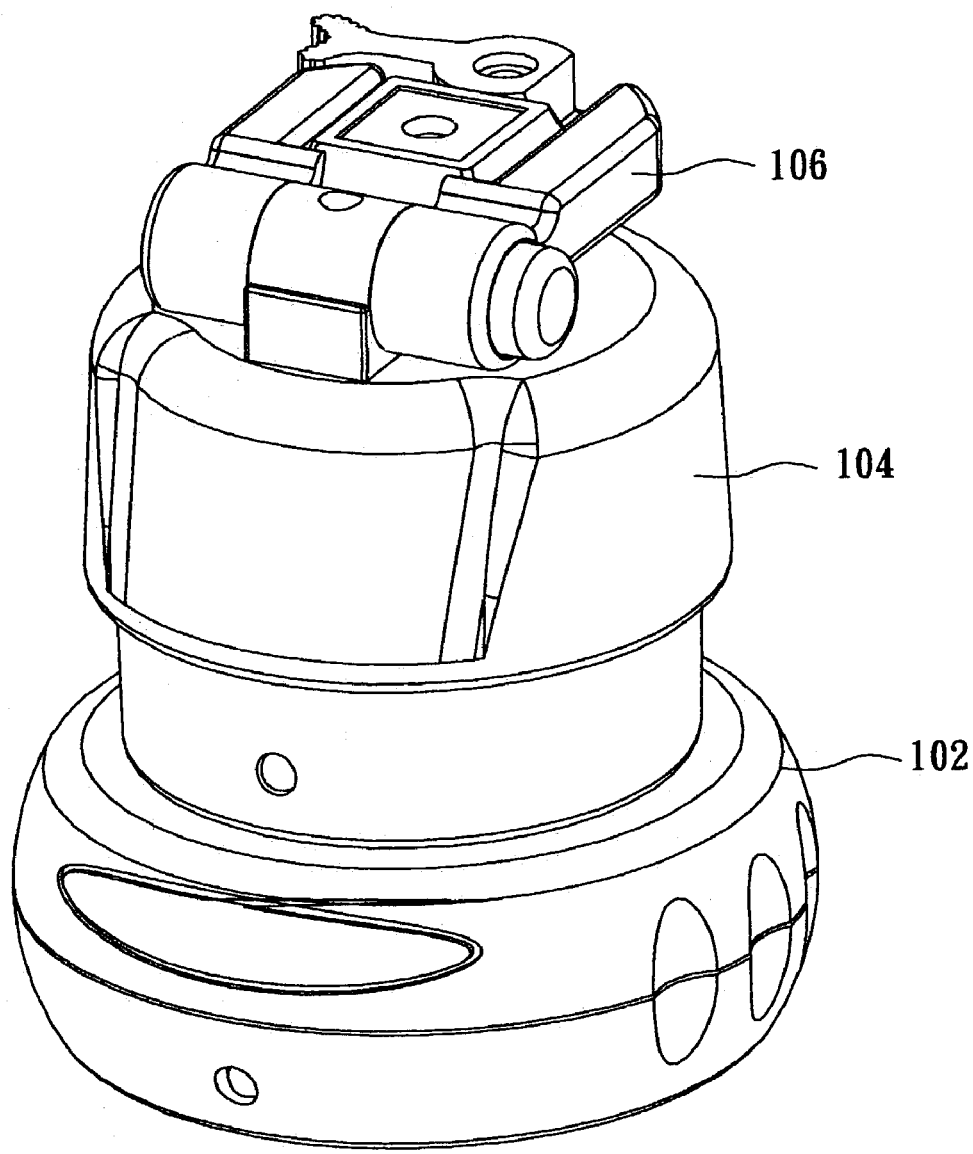
FIG. 1A is a front elevational view of a camera platform assembly according to the first embodiment of the present invention.
Figure 1B:
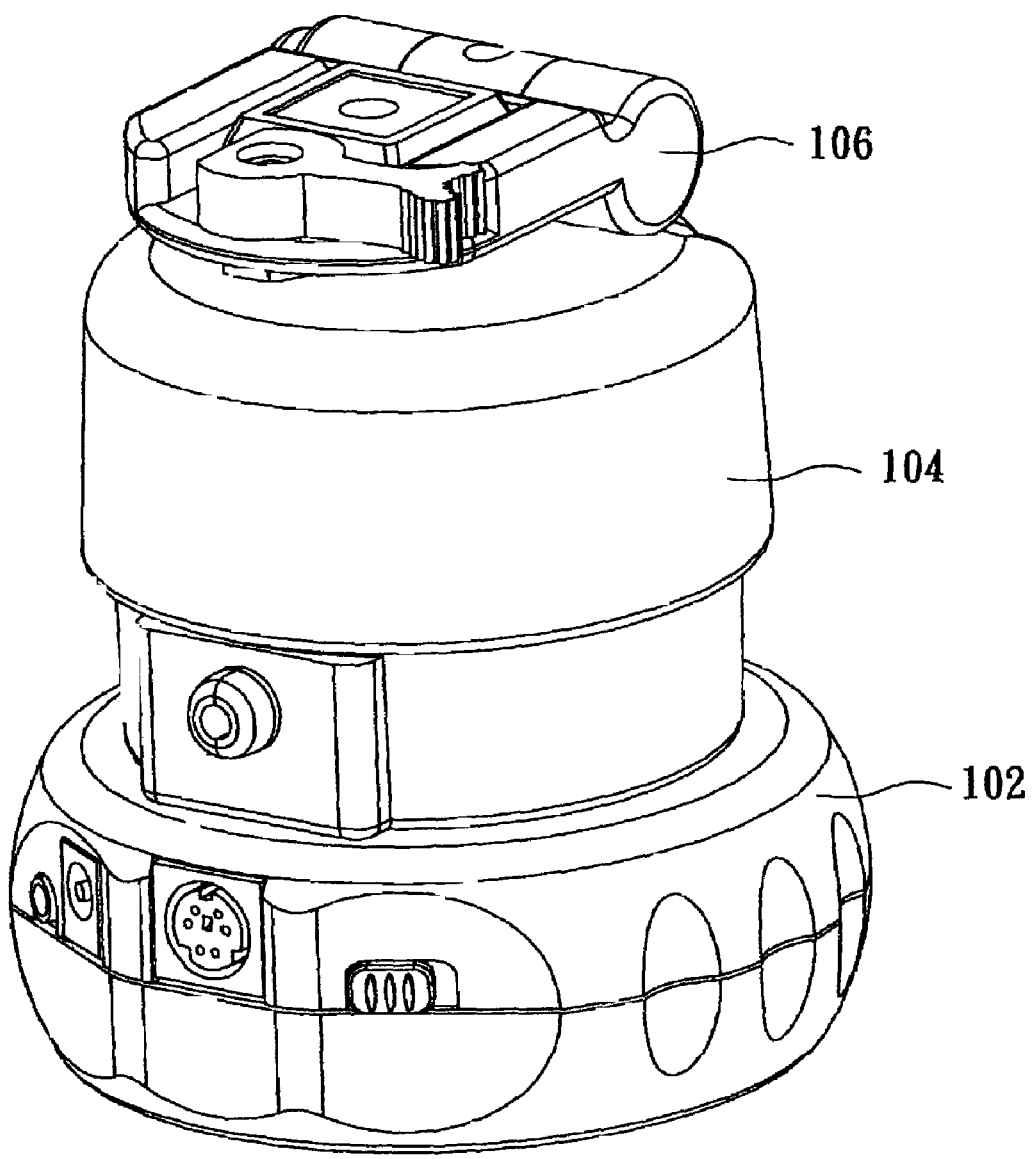
FIG. 1B is a rear elevational view of the camera platform assembly according to the first embodiment of the present invention.
Figure 1C:
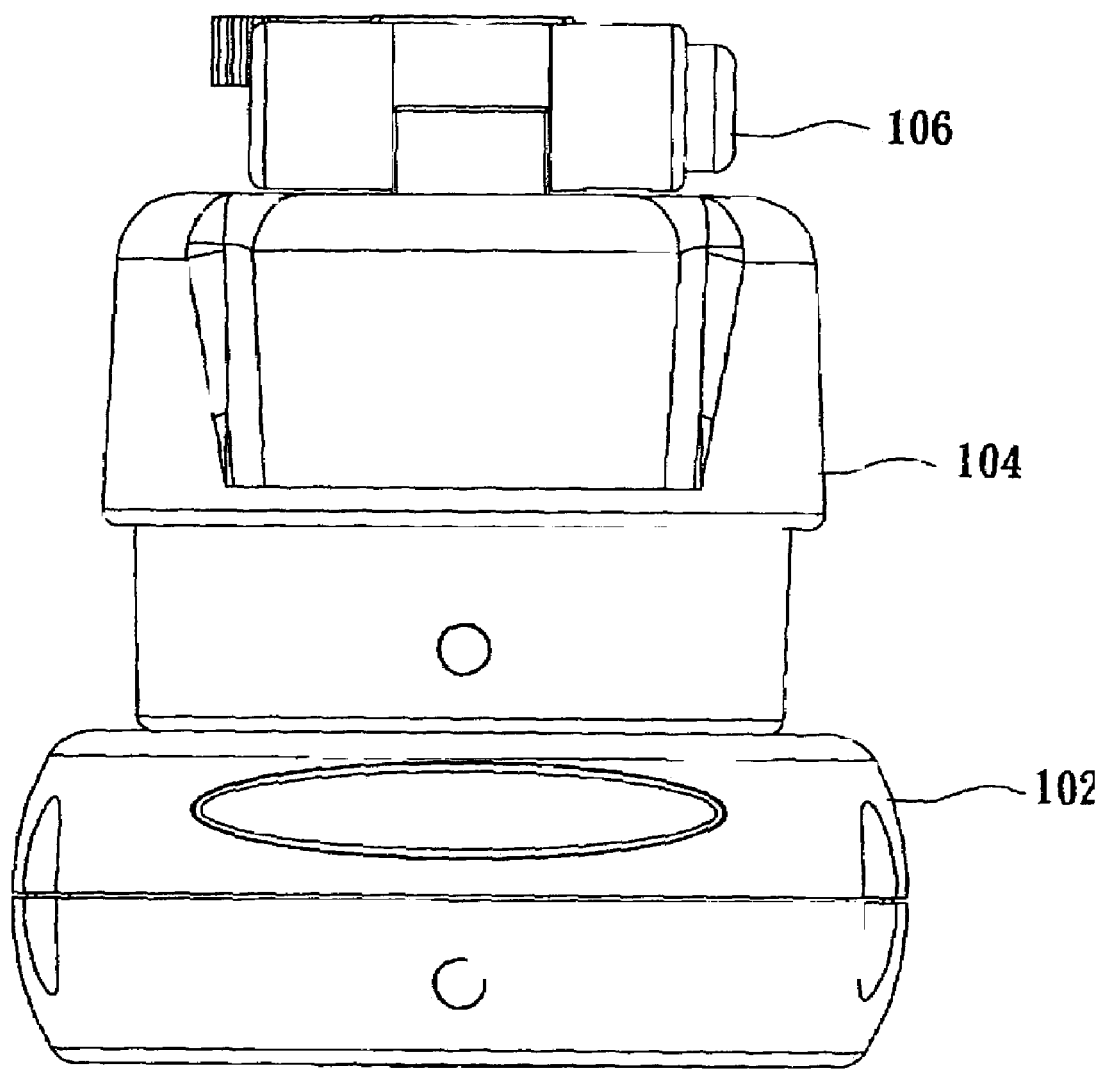
FIG. 1C is a front plan view of the camera platform assembly according to the first embodiment of the present invention.
Figure 1D:
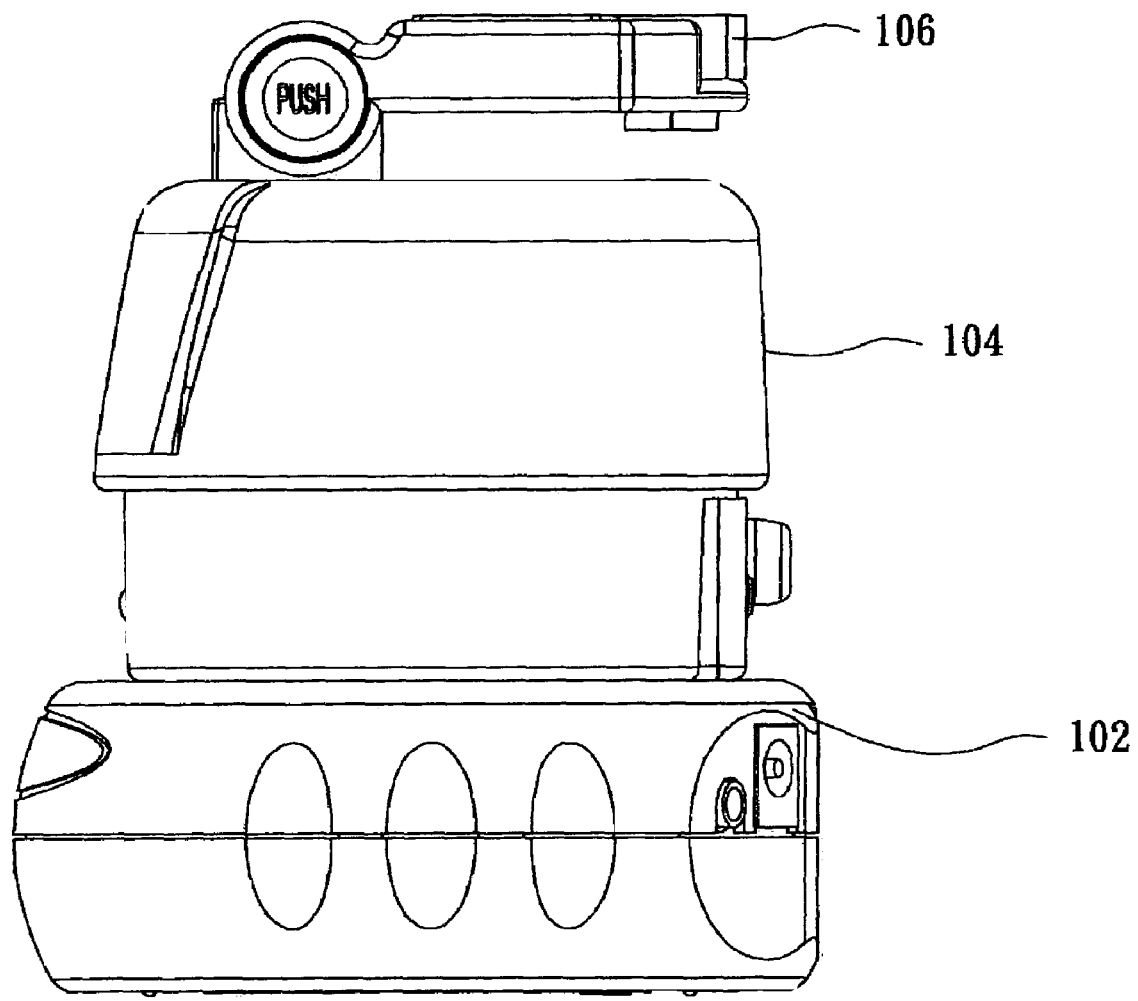
FIG. 1D is a side plan view of the camera platform assembly according to the first embodiment of the present invention.
Figure 1E:
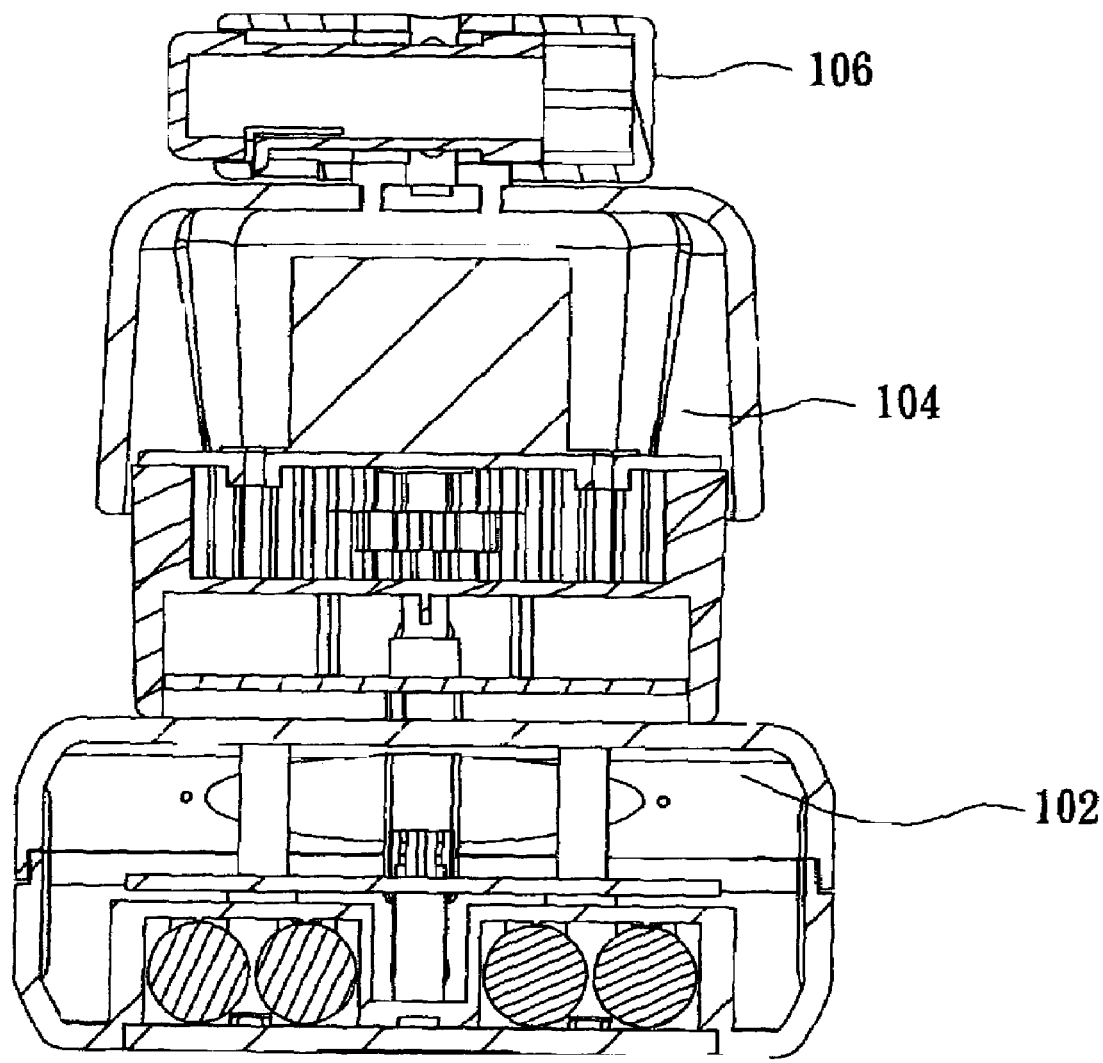
FIG. 1E is a sectional plan view of the camera platform assembly according to the first embodiment of the present invention.
Figure 1F:
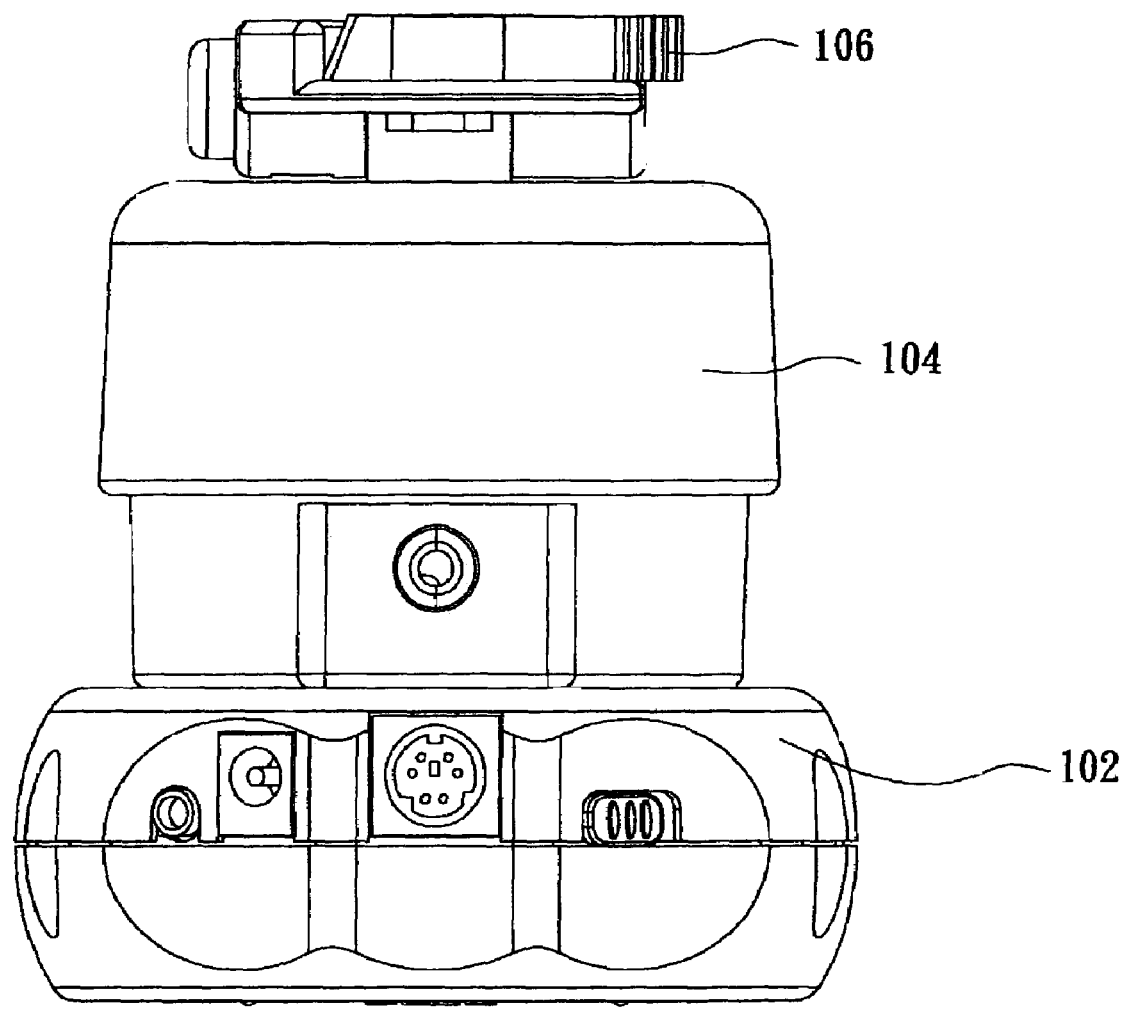
FIG. 1F is a rear plan view of the camera platform assembly according to the first embodiment of the present invention.
Figure 4:
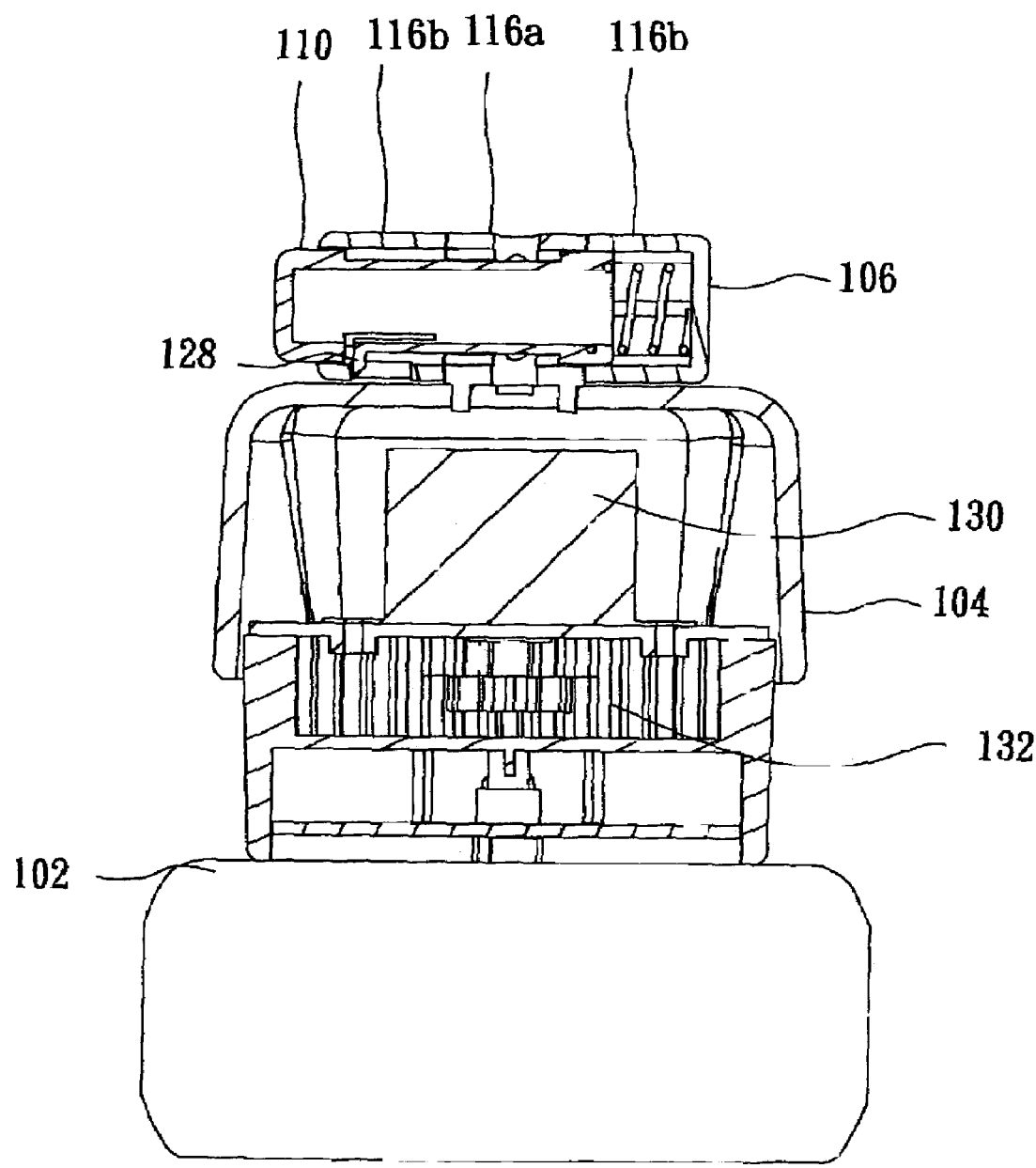
FIG. 4 is a sectional view taken along line A—A of FIG. 1A.

FIG. 4 is a sectional view taken along line A—A of FIG. 1A. As illustrated, the control shaft 110 comprises a male retaining portion 128 adapted to engage the female retaining portion 122. When the control shaft 110 is moved outwards from the unlocking position to the locking position, the male retaining portion 128 will be forced into engagement with the female retaining portion 122 to stop the control shaft 110 in the locking position, preventing falling of the control shaft 110 out of the movable rack 106 and the rotary table 104.

Referring to FIG. 4 again, the rotary table 104 further comprises a motor 130 and a transmission gear set 132. The motor 130 receives electricity from a power adapter or battery (not shown) and a control signal to rotate the rotary table 104. A power switch (not shown) is provided to control the operation of the motor 130. The transmission gear set 132 is coupled between the output shaft of the motor 130 and the control base 102 for rotating the rotary table 104 relative to the control base 102 when the motor is started.

Figure 5:
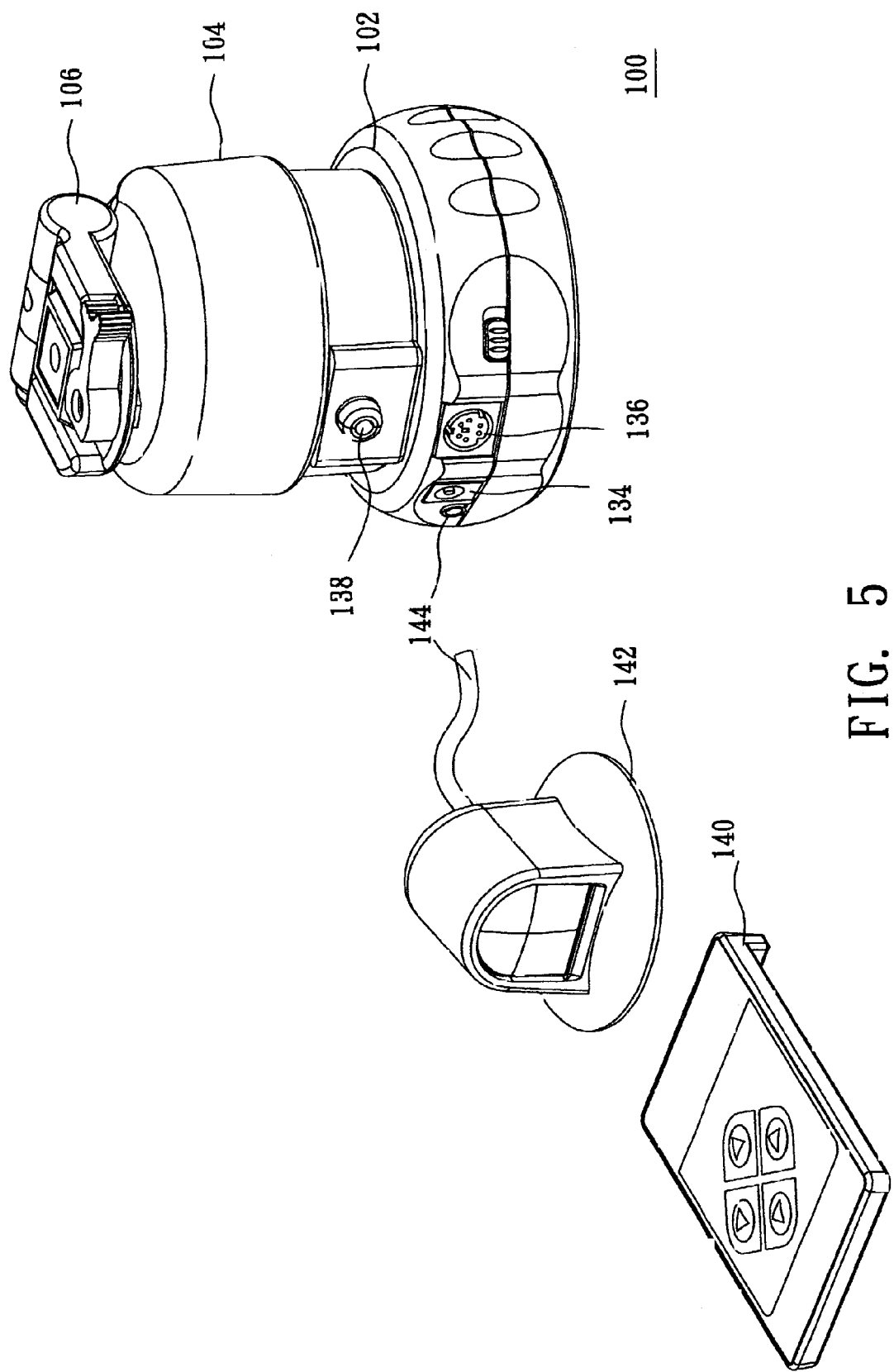
FIG. 5 illustrates the use of the camera platform assembly with a receiver and a remote controller according to the first embodiment of the present invention.

Referring to FIG. 5, the control base 102 comprises a power jack 134 for power input, a signal connector 136 for the connection of the signal line 144 of a receiver 142 adapted to receive control signal from a remote controller 140, and a port 138 for connection to a computer for signal output from the camera carried on the movable rack 106 to a linked computer. By means of the remote controller 140, the user can control the rotation of the rotary table 104 of the camera platform assembly 100 from a remote place. Therefore, it is convenient to use a camera with the camera platform assembly 100 to observe wild animals in a specific place.

Figure 6:
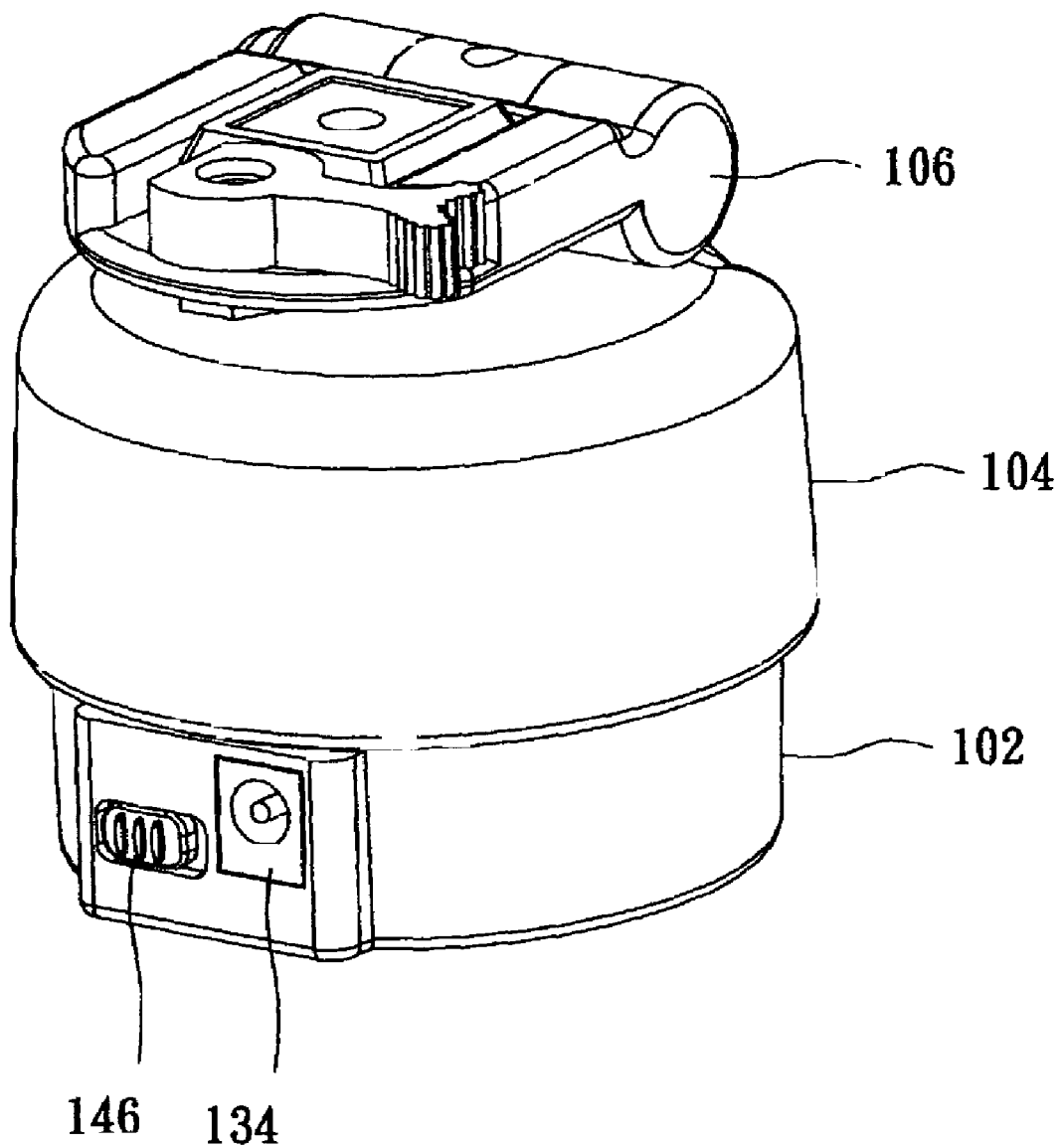
FIG. 6 is an elevational view of a camera platform assembly according to the second embodiment of the present invention.

FIG. 6 is an elevational view of the second embodiment of the camera platform assembly 100 according to the present invention. According to this embodiment, the camera platform assembly 100 is comprised of a control base 102, a rotary table 104, and a movable rack 106. The control base 102 comprises a power jack 134 for power input, and a power switch 146 adapted to control the operation of the motor (not shown). Similar to the aforesaid first embodiment of the present invention, the movable rack 106 is pivoted to the rotary table 104 for enabling the user to adjust the angle of inclination of the loaded camera (not shown).

A prototype of camera platform assembly has been constructed with the features of FIGS. 1~6. The camera platform assembly functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A camera platform assembly adapted to carry a camera and to control the angular position of the camera, comprising:
    a control base adapted to receive control signal for controlling the position of a camera carried on the camera platform assembly;
    a rotary table coupled to said control base for free rotation to adjust the position of a camera carried on the camera platform assembly, said rotary table comprising a barrel fixedly located on a top side thereof, and a plurality of locating grooves axially formed in the barrel of said rotary table and arranged in parallel; and
    a movable rack coupled to said rotary table and adapted to hold a camera and to adjust the angle of inclination of the camera carried thereon, said movable rack comprising a base frame, said base frame comprising two barrels axially aligned in a line at two sides of the barrel of said rotary table and a plurality of locating grooves axially formed in one barrel of said movable rack and arranged in parallel corresponding to the locating grooves of said rotary table, a control shaft inserted into the barrels of said movable rack and the barrel of said rotary table to pivotally secure said base frame to the barrel of said rotary table and axially movable relative to the barrels of said base frame and the barrel of said rotary table between a first position to lock said base frame and a second position to unlock said base frame for enabling said base frame to be turned relative to said rotary table, said control shaft having a plurality of longitudinal teeth arranged in parallel around the periphery thereof and adapted to engage the locating grooves of said base frame and the locating grooves of said rotary table, a holder frame mounted on said base frame and adapted to accommodate a camera, and a locking member pivoted to said base frame and adapted to lock said holder frame.

2. The camera platform assembly as claimed in claim 1, wherein said teeth of said control shaft are engaged into both the locating grooves of said base frame and the locating grooves of said rotary table to stop said movable rack from moving relative to said rotary table when said control shaft is shifted to said locking position.

3. The camera platform assembly as claimed in claim 1, wherein said teeth of said control shaft are engaged into the locating grooves of said base frame and disengaged from the locating grooves of said rotary table for enabling said movable rack to be turned relative to said rotary table when said control shaft is shifted to said unlocking position.

4. The camera platform assembly as claimed in claim 1 further comprising a spring member supported between said control shaft and one barrel of said base frame of said movable rack to impart a pressure to said control shaft and to support said control shaft in said locking position.

5. The camera platform assembly as claimed in claim 1, further comprising stop means adapted to stop said control shaft in said locking position, said stop means comprising a female device formed in one barrel of said base frame and a male device formed in the periphery of said control shaft and adapted to engage said female device.

6. The camera platform assembly as claimed in claim 1, wherein said control base comprises a power jack for power input, a signal connector for signal input, and a receiver connected to said signal connector and adapted to receive control signal from a remote controller for controlling the rotation of said rotary table.

7. The camera platform assembly as claimed in claim 6, wherein sad rotary table further comprises:
   a motor electrically connected to said power jack and adapted to receive control signal from said receiver and to rotate said rotary table relative to said control base according to received control signal; and
   a transmission gear set coupled between an output shaft of said motor and said control base and adapted to rotate said rotary table relative to said control base subject to the operation of said motor.

8. A movable rack coupled to a barrel at a rotary table for camera platform assembly and adapted to carry a camera and to adjust the angle of inclination of the camera, the movable rack comprising:
   a base frame, said base frame comprising two barrels axially aligned in a line at two sides of the barrel of said rotary table, and a plurality of locating grooves axially formed in one barrel of said movable rack and arranged in parallel corresponding to respective locating grooves in the barrel of said rotary table;
   a control shaft inserted into the barrels of said movable rack and the barrel of said rotary table to pivotally secure said base frame to the barrel of said rotary table and axially movable relative to the barrels of said base frame and the barrel of said rotary table between a first position to lock said base frame and a second position to unlock said base frame for enabling said base frame to be turned relative to said rotary table, said control shaft having a plurality of longitudinal teeth arranged in parallel around the periphery thereof and adapted to engage the locating grooves of said base frame and the locating grooves of said rotary table;
   a holder frame mounted on said base frame and adapted to accommodate a camera; and
   a locking member pivoted to said base frame and adapted to lock said holder frame.

9. The movable rack as claimed in claim 8, wherein said teeth of said control shaft are engaged into both the locating grooves of said base frame and the locating grooves of said rotary table to stop said movable rack from moving relative to said rotary table when said control shaft is shifted to said locking position.

10. The movable rack as claimed in claim 8, wherein said teeth of said control shaft are engaged into the locating grooves of said base frame and disengaged from the locating grooves of said rotary table for enabling said movable rack to be turned relative to said rotary table when said control shaft shifted to said unlocking position.

11. The movable rack as claimed in claim 8, further comprising a spring member supported between said control shaft and one barrel of said base frame of said movable rack to impart a pressure to said control shaft and to support said control shaft in said locking position.

12. The movable rack as claimed in claim 8, further comprising stop means adapted to stop said control shaft in said locking position, said stop means comprising a female device formed in one barrel of said base frame and a male device formed in the periphery of said control shaft and adapted to engage said female device.

* * * * *